(12) United States Patent
Shan et al.

(10) Patent No.: US 8,170,597 B2
(45) Date of Patent: May 1, 2012

(54) METHOD AND APPARATUS FOR JOINTLY CONTROLLING TRANSMIT POWER IN COGNITIVE RADIO COMMUNICATION SYSTEM

(75) Inventors: Cheng Shan, Suwon-si (KR); David Mazzarese, Suwon-si (KR); Sung-Kwon Hong, Seoul (KR); Do-Young Kim, Yongin-si (KR); Eun-Taek Lim, Suwon-si (KR); Jung-Soo Woo, Suwon-si (KR); Deok-Ki Kim, Seongnam-si (KR); Yong-Ho Park, Suwon-si (KR); Hyeon-Woo Lee, Suwon-si (KR); Geun-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 12/217,567

(22) Filed: Jul. 7, 2008

(65) Prior Publication Data

US 2009/0011788 A1 Jan. 8, 2009

(30) Foreign Application Priority Data

Jul. 6, 2007 (KR) .......................... 10-2007-0067850

(51) Int. Cl.
 *H04B 7/00* (2006.01)

(52) U.S. Cl. .................... 455/522; 455/63.1; 455/67.13; 455/179.1; 455/422.1; 455/501; 455/509; 370/319; 370/338

(58) Field of Classification Search ............... 455/522, 455/69, 13.4, 63.1, 67.11, 67.13, 127.1, 179.1, 455/422.1, 450, 501, 509; 370/319, 329, 370/338
See application file for complete search history.

(56) References Cited

U.S. PATENT DOCUMENTS

| 7,801,490 | B1 * | 9/2010 | Scherzer | 455/67.13 |
| 2008/0089279 | A1 * | 4/2008 | Hu et al. | 370/329 |
| 2008/0261537 | A1 * | 10/2008 | Chen | 455/68 |

FOREIGN PATENT DOCUMENTS

| KR | 1020040107163 A | 12/2004 |
| KR | 1020050114589 A | 12/2005 |
| KR | 1020060060452 A | 6/2006 |
| WO | WO 2007/014021 A2 | 2/2007 |

* cited by examiner

*Primary Examiner* — Shaima Q Aminzay (57) ABSTRACT

Provided is an apparatus and method for controlling power in a cognitive radio wireless communication system, the method comprising: performing channel scheduling and the first power control for at least one terminal; checking whether the at least one terminal exist within constraint area, and determining whether the at least one terminal within constraint area cause interference to incumbent system; and performing the secondary power control so that an allocating power may be less than the maximum tolerable interference.

18 Claims, 4 Drawing Sheets

METHOD AND APPARATUS FOR JOINTLY CONTROLLING TRANSMIT POWER IN COGNITIVE RADIO COMMUNICATION SYSTEM

CROSS-REFERENCE TO RELATED APPLICATION(S) AND CLAIM OF PRIORITY

The present application claims priority under 35 U.S.C. §119(a) of a Korean patent application filed in the Korean Intellectual Property Office on Jul. 6, 2007 and assigned Serial No. 2007-67850, the entire disclosure of which is incorporated herein by reference.

TECHNICAL FIELD OF THE INVENTION

The present invention relates generally to a power control in Cognitive Radio (CR) communication system, and in particular, to a method and an apparatus for jointly controlling transmit power in CR communication system, which can be working in the same band with a co-existing incumbent system. The incumbent system is referred to as a system (e.g., TV broadcasting system), which already assigns licensed band and performs a communication service.

BACKGROUND OF THE INVENTION

As wireless communication technologies develop rapidly, 2nd Generation (2G), 3rd Generation (3G) and 4th Generation (4G) systems co-exist and operate with incumbent systems. However, since all available frequencies are occupied, a new frequency assignment within a few gigahertz is difficult, and limited free frequency bands cause frequency interference between heterogeneous devices in deploying a new wireless communication system. Yet, there are unused spectrums at or above 2 GHz and partially unused TV spectrums at or below 1 GHz. Hence, the Federal Communications Commission (FCC) has conducted a study on real spectrum use of these unused or under-utilized frequencies and sought comments on unlicensed access to unused frequencies through the Notice of Proposed Rule Making (NRPM) in order to increase frequency use efficiency.

For example, there is the Cognitive Radio (CR) system, which senses unused and empty frequencies (or channels) in the licensed band, and uses the unused frequency. Using CR technologies, a CR system can solve the problem of frequency shortage but must not give any inference to primary users in an incumbent system, which pays for and uses the frequency band, during the frequency sharing. That is, considering a communication environment in which the CR system co-exists with the incumbent system (e.g., TV broadcasting system), whenever terminals of an incumbent system want communication service, they can use licensed bands after accessing the channels. However, Customer Premise Equipments (CPEs) of the CR system can use the licensed band of the incumbent system and cause no interference to the incumbent system.

There are two means for the CR system to coexist with the incumbent system. First, it can seek to utilize remaining "available channels" which are not occupied by the incumbent system. Second, it can utilize those channels occupied by the incumbent system, given that the transmission devices in the CR system are far enough away from the incumbent system so that no excessive interference would be caused to the incumbent system. In this invention, we are in particular considering the second method of co-existence.

In the first case, the CR system does not cause interference to the incumbent system when the CR system opportunely uses the empty channels after detects empty channels. For example, when the incumbent system is operating channel n, the CR system uses another channel excluding the channel n, or will not use channel n while the incumbent system uses channel n. Therefore, the CR system gives no interference to the incumbent system. However, in the second case, the incumbent system and the CR system do not intersect and the CR system is far enough away from the incumbent system independently so that CR system and the incumbent system can use channel n simultaneously. But, it is necessary to control power so that a signal of the CR system does not cross a boundary where that of the incumbent system reaches. For example, in an Orthogonal Frequency Division Multiple Access (OFDMA)-based CR system, because multiplexed sub-carriers are allocated to multiple users, the multiple users can use the same OFDM symbol. When each of N user terminals transmits with 1 W power, the incumbent system receives interference of total N*1 W power.

SUMMARY OF THE INVENTION

To address the above-discussed deficiencies of the prior art, it is a primary object of the present invention to provide an apparatus and a method so that a CR system coexisting with incumbent system would not cause excessive harmful interference to the incumbent system when the CR system schedules multiple devices to transmit simultaneously in a channel.

Another object of the present invention is to provide a joint power control apparatus and method for controlling the transmission power of multiple scheduled devices within a corresponding channel.

According to one aspect of the present invention, there is provided a method for controlling power in a cognitive radio wireless communication system, the method including the steps of: performing channel scheduling and the first power control for at least one terminal; checking whether the at least one terminal exist within constraint area, and determining whether the at least one terminal within constraint area cause interference to incumbent system; and performing the secondary power control so that an allocating power may be less than the maximum tolerable interference.

According to another aspect of the present invention, there is provided an apparatus for controlling power in a cognitive radio wireless communication system, the apparatus comprising: a scheduler for performing channel scheduling and the first power control for at least one terminal; a controller for checking whether the at least one terminal exist within constraint area, and determining whether the at least one terminal within constraint area cause interference to incumbent system; and a power allocator for performing the secondary power control so that an allocating power may be less than the maximum tolerable interference.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide a joint power control apparatus and method for minimizing interference caused by a licensed frequency sharing in a cognitive radio (CR) wireless communication system.

In FIGS. 1 through 4, we assume that the CR system is an orthogonal frequency division multiple access (OFDMA) wireless communication system, which can sense a TV channel band and reuse it according to the result of the channel sensing. The terminals of a CR system are referred to as customer premises equipment (CPE) in this invention disclosure.

Figure 1:
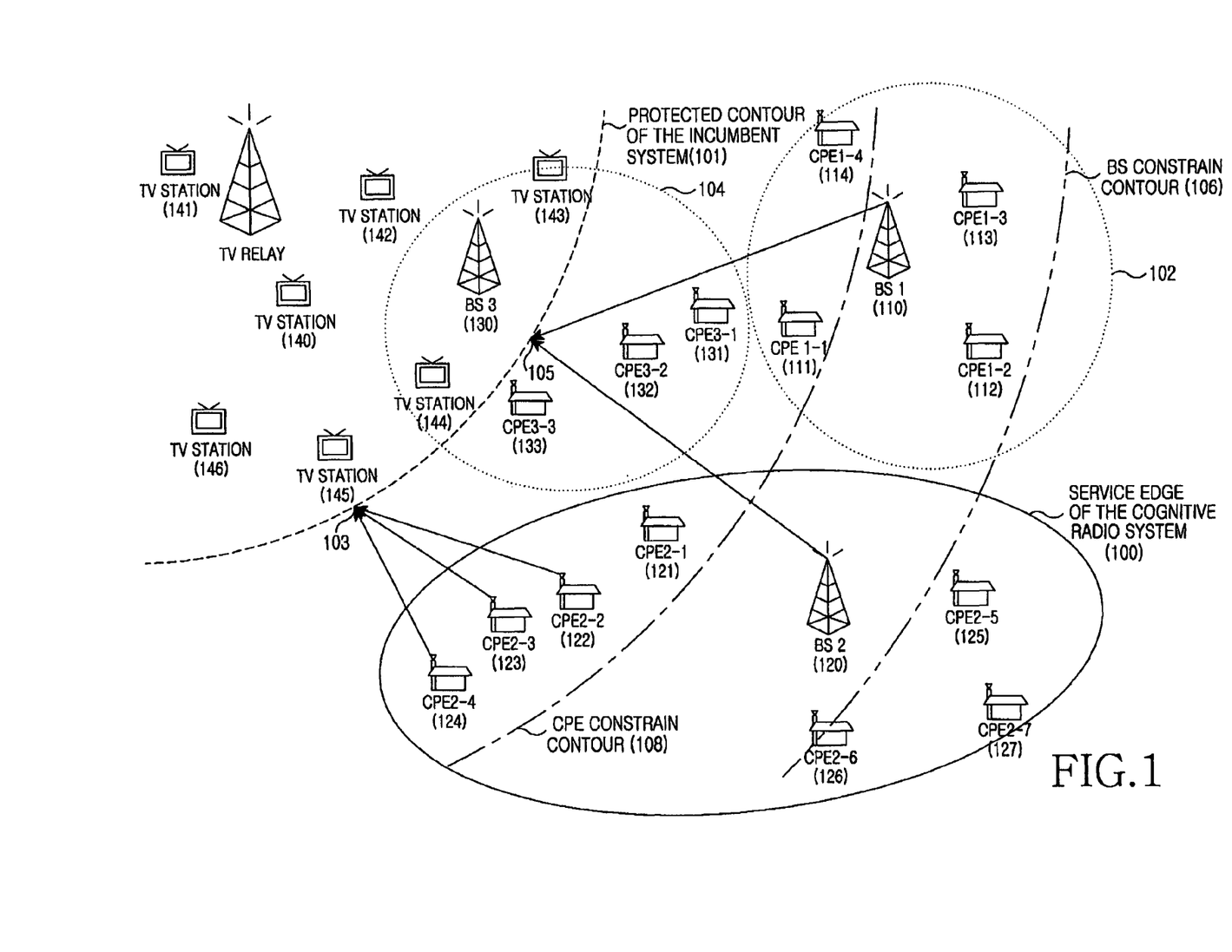
FIG. 1 illustrates examples of a joint power control in environment that CR system coexists with incumbent system at a distance according to the present invention.

FIG. 1 illustrates examples of a joint power control in environment that CR system coexists with an incumbent system at a distance according to the present invention.

Referring to FIG. 1, in the CR system, base stations 110, 120 and 130 communicate with a plurality of corresponding CPEs, reusing channel bands of a TV broadcasting system. Coverage of a base station (BS) is referred to as "a cell". In any cell, the corresponding CPEs can set up for communication connection with the BS. A communication link from a BS to a CPE is referred to as a DownLink (DL), a communication link from a CPE to a BS is referred to as an UpLink (UL).

Devices of the CR system (e.g., CPE, BS) cannot transmit on the channel n occupied by TV broadcasting system within TV signal protect contour 101 and its adjacent channels. However, the CR system can reuse channels that the TV broadcasting system have used, when the CR system give no interference to TV broadcasting system.

Here, the devices of the CR system must be away from TV signal protect contour 101 enough to transmit on its adjacent channels, as well as the channels occupied by TV broadcasting system within maximum tolerable power. The TV signal protect contour 101 is the boundary which a broadcasting signal of TV relay is propagated. Devices of CR system can reuse channel band using TV broadcasting system, when the Devices of CR system is away from the TV signal protect contour 101.

In an OFDMA based CR system, multiple CPEs might be scheduled in the same OFDM symbol during uplink (UL) transmission; while multiple BSs might transmit on the same channel simultaneously during downlink (DL) transmission. In such cases, if the simultaneously transmitting devices are close to a common segment of the protect contour of the incumbent system, their interference aggregate at the said segment of protect contour and may cause excessive interference. Thus joint transmit power control (JTPC) upon those simultaneously transmitting devices in the CR system is needed.

For example, Assume the TV stations 140 to 146 is operating on channel N; BS1 110 and BS2 120 are also operating on channel N since they are outside of the TV signal protect contour 101. However, BS1 110 and BS2 120 are close to a common segment of TV signal protect contour 101, JTPC on BS1 110 and BS2 120 is needed to avoid the aggregated harmful interference to the primary TV system (105). BS2 120 schedules it's CPE2-1~4 121 to 124 simultaneously transmitting on one OFDM symbol period. JTPC on CPE2-1~4 121 to 124, which are close to a common segment of the TV signal protect contour 101, is needed to avoid the aggregated harmful interference to the primary TV system (103). BS3 130 is located inside the TV signal protect contour 101; it cannot transmit on channel N and must use another channel. There is no JTPC problem for BS3 130 and its CPEs 131 to 133 on channel N.

However, it is noted that the maximum aggregated interference along the TV signal protect contour 101 is not easy to calculate, consider the different geographical deployment, power assignment, antenna direction of CPEs/BSs. Moreover, the step-size of power decrease must be carefully chosen to ensure efficiency. The concept of constrain area is either clearly defined.

For a given channel N, constrain contours 106, 108 are defined so that the incumbent TV signal strength at the constrain contour 106, 108 is Δ dB lower than that at the TV signal protect contour 101. It is also noted that the value for CPE and BS are different, which can be seen in FIG. 1. Generally, the Δ for BS is larger than Δ for CPE since BS usually transmit with larger power. That is, the CPE constrain contour 108 is determined so that a signal strength of CPE received at the TV signal protect contour 101 is less than or equal to an interference signal strength limited for protecting TV broadcasting system. Therefore, if there are no adjacent CPEs using the same channel, the CPEs which is located outside the CPE constrain contour 108 can transmit using maximum transmit power without considering TV signal protected contour 101. Likewise, a BS constrain contour 106 is determined so that a signal strength of BS received at the TV signal protect contour 101 is less than or equal to the interference signal strength limited for protecting TV broadcasting system. Therefore, if there are no adjacent BSs using the same channel, BSs which is located outside the BS constrain contour 106 can transmit using maximum transmit power without considering TV signal protect contour 101.

Figure 2:
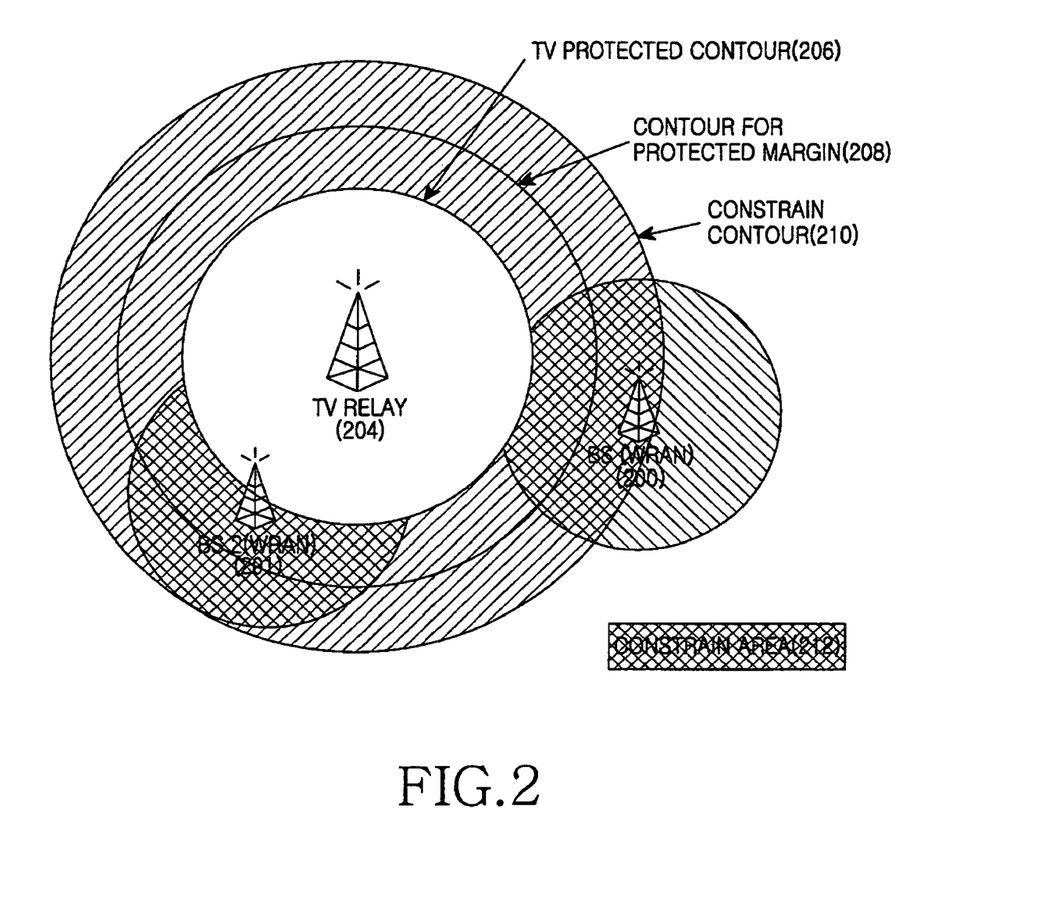
FIG. 2 illustrates examples of constrain area according to an exemplary embodiment of the present invention.

As another example, in FIG. 2, TV protect contour 206 is a required boundary, which limits interference induced by CR system to protect TV broadcasting system. We can predefine a margin for the protection of the TV broadcasting to consider unexpected interference. Namely, protection margin contour 208 is extended to outside the TV protect contour 206.

If protection margin contour 208 is predefined, constrain contour 210 with the protection margin contour 208 is extended to outside. Therefore, it can forcefully reduce interference to TV broadcasting system. As another example, instead of predefining the protection margin contour 208, the constrain contour 210 is extended to outside to include margin value.

The constrain area 212 is the intersection of the area between the TV protect contour 206 and the constrain contour 210, and cell coverage of the given cell 200, 201. FIG. 2 illustrates a few example of the constrain area. Here, the constrain area 212 in FIG. 2 is the constrain area for CPE or the constrain area of BS, but constrain contour 210 and constrain area 212 for each of CPE and BS exists.

A minimum distance from the TV protect contour 206 is called as the keep-out distance for co-channel or adjacent channel transmissions, and the regions around the incumbent system with keep-out distances is called as the keep-out regions. If a device of the secondary CR system is deployed inside the keep-out region, it can be allowed to transmit on the said channels. The maximum allowed transmit power is determined by the distance from the protected contour. We refer such a power control mechanism as individual power control of the CR system in the invention.

The constrain area 212 is defined as Service region for CR system between the constrain contour 210 considering maximum transmit power and the TV protect contour 206. Namely, CPE or BS located in the constrain area 212 have to determine it's transmit power with considering interference induced at the TV protect contour 206. Therefore, the following joint transmit power control (JTPC) is performed by BSs located in the constrain area 212.

In FIG. 1, for CPE JTPC on channel N, in cell1 102 of BS1 110, CPE1-1 111 and CPE1-4 114 are within the CPE constrain contour 108 while CPE1-2 112 and CPE1-3 113 are not; in cell2 100 of BS2 120, CPE2-1~4 121 to 124 are within the CPE constrain contour 108 while CPE2-5~7 125 to 127 are not.

For BS JTPC on channel N, BS1 110 and BS2 120 are within the BS constrain contour 106 while BS3 130 is not, since it is located within the TV signal protect contour 101 of channel N. Thus, it is needed JTPC for BS1 110 and BS2 120 and not needed JTPC for BS3 130.

The CPE3-x do not need JTPC on channel N since BS3 130 is located inside the protect contour, thus unable to operate on channel N. In a preferred embodiment, it is also assumed that the BS3 130 can either operate on channel N+1 and N−1 since it is inside the protect contour of channel N. However, BS3 130 could operate on channel N±2 and above since it might be outside the protect contour of these channel defined from the perspective of incumbent active channel N. Thus, there might be necessity for CPE3-x to perform JTPC on channel N±2 and above. It is also noted here, the TV protect contour, constrain contour and constrain area for channel N±2 and above are different from those of channel N.

In summary, JTPC is necessary for BS on channel N when BSs are using the same channel N, the said BSs are outside of the TV protect contour of channel N and the said BSs are close to a common segment of TV protect contour on channel N. Similarly, JTPC is necessary for CPEs on channel N in a cell when multiple CPEs are scheduled in at least one common OFDM symbol, and the said CPEs and their BS are all outside of the TV protect contour on channel N and the said CPEs are close to a common segment of TV protect contour on channel N.

In this invention, a geo-location information includes a location of protect contour and the distance between each CPEs of CR system to a TV signal protect contour 101. Also, we assume the CR system knows the path loss between from each CPE to TV signal protect contour 101. Thus, CR system can determine constraint area 212 in FIG. 2, and can select devices is need JTPC with using the geo-location information We assume the available bandwidth to both incumbent and CR systems are partitioned into multiple contiguous bands. We call each individual band as a channel. In this invention, we assumed all the available channels for both incumbent and CR systems are index with integer number 0, 1, 2, 3, . . . in an incremental order of positions in the spectrum. The incumbent system provides services to its user on per channel basis. Since the protected contour might be different from channel to channel, and the secondary CR system might schedule its devices differently on each channel, the joint power control must be performed for each single channel the secondary CR system is going to operate on.

Figure 3:
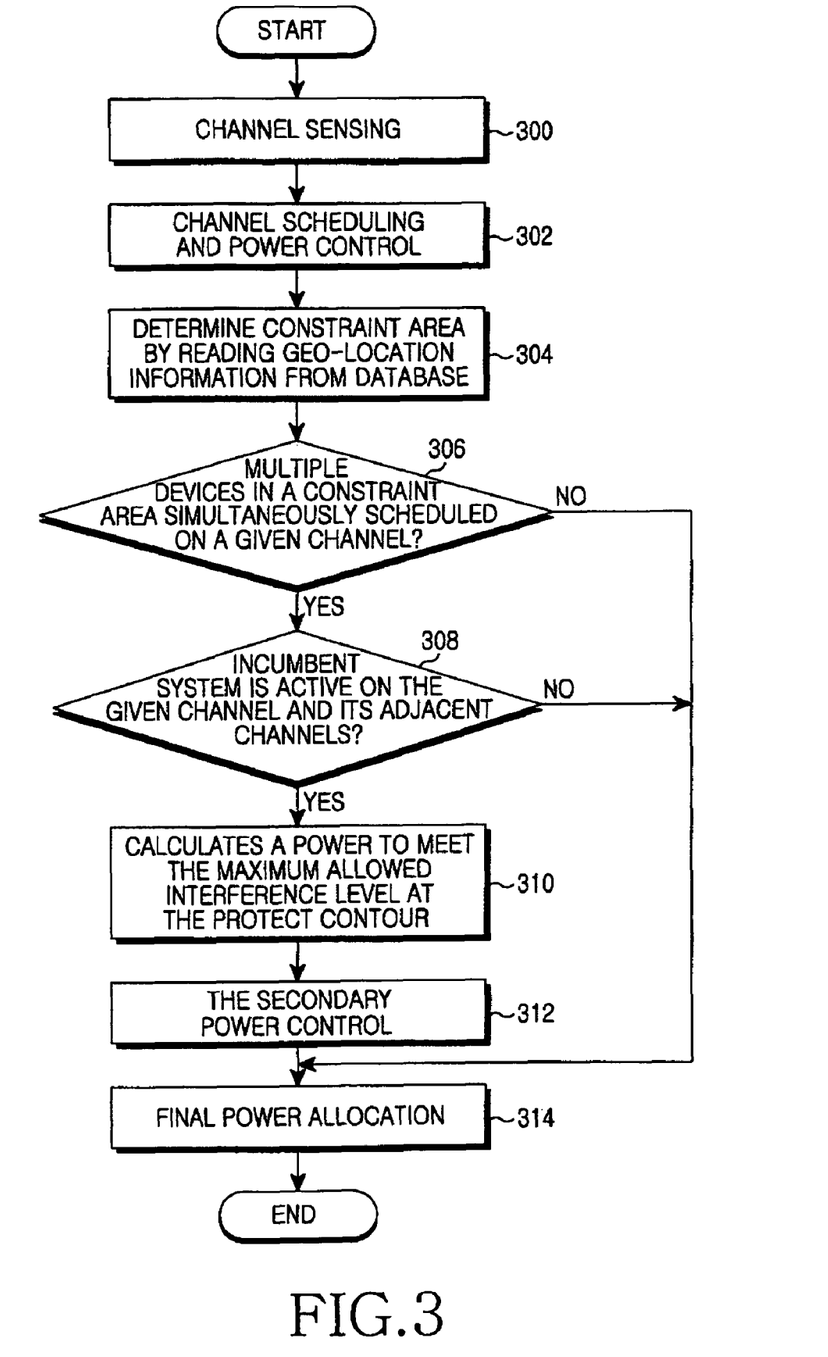
FIG. 3 is a flowchart of a joint power control operation of a BS in the CR wireless communication system according to an exemplary embodiment of the present invention.

FIG. 3 is a flowchart of a joint power control operation of a BS in the CR wireless communication system according to an exemplary embodiment of the present invention.

Referring to FIG. 3, the BS performs channel sensing and obtains channel n available in step 300.

In step 302, the BS performs scheduling and power control for channel n available. For example; the BS selects service CPEs according to the channel state and the geographical position of CPEs, and allocates subcarriers and transmission power of CPEs, during scheduling. Then allocated transmission power is referred to as $P_{CPE,k,n}^{(0)}$, where k is index of CPE, n is channel index.

The allocated $P_{CPE,k,n}^{(0)}$ must be satisfactory to Equation 1, namely, the power allocated to CPE k $P_{CPE,k,n}^{(0)}$ must be not large than maximum tolerable interference level:

$$I_{n,m}(P_{CPE,k,n}^{(0)},d_m) \leq T_{max,m} - \Omega', \quad \text{[Eqn. 1]}$$

where n is channel index, m is index of its adjacent channel, $-M \leq m \leq M$, channel n and its adjacent channel m is referred to as channel n+m.

The $d_m$ is the distance between CPE k and the incumbent protect contour of channel n+m, $T_{max,m}$ is the maximum tolerable interference level at protect contour. $\Omega'$ is a predefined margin for protection of the incumbent system for individual CPE power control, $I_{n,m}(P_{CPE,k,n}^{(0)},d_m)$ is the interference level induced on channel n+m. For example, if m=0, $I_{n,m}(P_{CPE,k,n}^{(0)},d_m)$ is the co-channel interference toward the incumbent protect contour, and if m>0, $I_{n,m}(P_{CPE,k,n}^{(0)},d_m)$ is the interference induced at channel due to the out-band emission. That is, in case m=0, the interference induce on adjacent channel m happens.

$I_{n,m}(P_{CPE,k,n}^{(0)},d_m)$ is calculated as using the path loss and out band emission factor ($\beta_m$):

$$I_{n,m}(P_{CPE,k,n}^{(0)},d_m) = P_{CPE,k,n}^{(0)} \cdot PL(d_m) \cdot \beta_m, \quad \text{[Eqn. 2]}$$

where PL(d) is the path loss the said CPE to the protected contour according to a certain predetermined channel model, $\beta_m$ is the out-band emission factor with $\beta_m < 1$.

In step 304, the BS reads information for protected contour of incumbent system using channel n+m from the geo-location database, and calculates CPE constrain contour. The intersection of the area between TV signal protect contour 101 and CPE constrain contour 108, the constrain area is performed JTPC, the detail procedure is out of the scope of this invention.

In step 306, the BS checks whether multiple devices in a constraint area simultaneously scheduled on channel n or not, and If multiple devices in a constraint area simultaneously does not schedule on channel n (there are no service CPEs in constraint area), the BS progresses in step 314. For example, in FIG. 1, CPE1-3, CPE1-2, CPE2-5 to CPE2-7 is excluded during JTPC procedure, because they give no interference to incumbent system.

If multiple devices in a constraint area simultaneously schedule on channel n (there are service CPEs in constraint area, in FIG. 1, it is performed JTPC for CPE1-1, CPE1-4, CPE2-1 to CPE2-4), the BS checks whether incumbent system is active on the channel n and its adjacent channels (channel n+m) in step 308. If channel n+m is not active, the BS progresses in step 314. Since channel n and channel m is not used in incumbent system, the interference isn't induced to the incumbent system for using channel N.

If the channel n+m is active, the BS calculates maximum power ($P_{CPE,k,n}^{max}$) according to maximum tolerable inference level in step 310. The $P_{CPE,k,n}^{max}$ is calculated as:

$$P_{CPE,k,n}^{max} = \frac{I_{max}}{PL(d_m)}, \quad \text{[Eqn. 3]}$$

where PL(d) is the path loss the said CPE to the protected contour according to a certain predetermined channel model, $I_{max}$ is maximum allowable inference level at protected contour for incumbent system.

In step 312, the BS reduces each level of CPE $P_{CPE,k,n}^{max}$ that total sum of power may not exceed maximum tolerable inference level. That is:

$$[P_{CPE,1,n}^{temp}, \ldots, P_{CPE,K,n}^{temp}] = f(P_{CPE,1,n}^{max}, \ldots, P_{CPE,K,n}^{max}); \quad \text{[Eqn. 4]}$$

and $$\sum_{k=1}^{K} I_{n,m}(P_{CPE,k,n}^{temp}, d_m) \leq T_{max,m} - \Omega,$$

where $f(\cdot)$ is the function that CPE k, $P_{CPE,k,n}^{temp}$ is a power allocated temporarily for CPE k, $d_m$ is the distance from CPE k to the incumbent protected contour of channel n+m, $T_{max,m}$ is the maximum tolerable interference level at the protected contour for channel n+m, $\Omega$ is a predefined margin for the protection of the incumbent system for individual CPE power control, $I_{n,m}(P_{CPE,k,n}^{(0)}, d_m)$ is the interference level induced on channel n+m.

Below are a few examples for function $f(\cdot)$. There are how to reduce power from the maximum one by the same amount for each of CPE, how to reduce CPE maximum power according to their allocated sub-carriers, how to reduce CPE maximum power according to their allocated sub-carriers as well as the sub-carrier reuse situation by peer CPEs.

How to reduce power from the maximum one by the same amount for each of CPE is calculated as:

$$P_{CPE,k,n}^{temp} = \frac{P_{CPE,k,n}^{max}}{K}, \quad \text{[Eqn. 5]}$$

where $P_{CPE,k,n}^{temp}$ is a power allocated temporarily for CPE k to satisfied with Equation 4, K is the number of service CPEs in constraint contour, and $P_{CPE,k,n}^{max}$ is the maximum power according to maximum tolerable inference level.

How to reduce CPE maximum power according to their allocated sub-carriers is calculated as:

$$P_{CPE,k,n}^{temp} = \frac{|B_k|}{\left|\bigcup_{k'=1}^{K} B_{k'}\right|} P_{CPE,k,n}^{max}, \quad \text{[Eqn. 6]}$$

where $P_{CPE,k,n}^{temp}$ is a power allocated temporarily for CPE k to satisfied with Equation 4, $P_{CPE,k,n}^{max}$ is the maximum power according to maximum tolerable inference level, $B_k$ is a set of carriers for CPE k. $|B_k|$ is the size of a set of carriers for CPE k, $\cup$ is an operation for sum of sets.

How to reduce CPE maximum power according to their allocated sub-carriers as well as the sub-carrier reuse situation by peer CPEs is calculated as:

$$P_{CPE,k,n}^{temp} = \frac{|B_k| \cdot |B_k|}{\left|\bigcup_{k'=1}^{K} B_{k'}\right| \left|\sum_{k'=1}^{K} |B_{k'} \cap B_k|\right|} P_{CPE,k,n}^{max}, \quad \text{[Eqn. 7]}$$

where $P_{CPE,k,n}^{temp}$ is a power allocated temporarily for CPE k to satisfied with Equation 4, $C_{CPE,k,n}^{max}$ is the maximum power according to maximum tolerable inference level, $B_k$ is a set of carriers for CPE k. $|B_k|$ is the size of a set of carriers for CPE k, $\cap$ is an operation for intersection, $\cup$ is an operation for sum of sets.

In step 314, the BS selects minimum power between $P_{CPE,k,n}^{temp}$ and $P_{CPE,k,n}^{(0)}$, and performs final power allocation:

$$P_{CPE,k,n}^{JTPC} = \min(P_{CPE,k,n}^{(0)}, P_{CPE,k,n}^{temp}), \quad \text{[Eqn. 8]}$$

where $P_{CPE,k,n}^{JTPC}$ is a assigned power during JTPC algorithms, $P_{CPE,k,n}^{(0)}$ is a assigned power during scheduling algorithms, $P_{CPE,k,n}^{temp}$ is the maximum power according to maximum tolerable inference level.

Then, the BS ends the joint power control.

Figure 4:
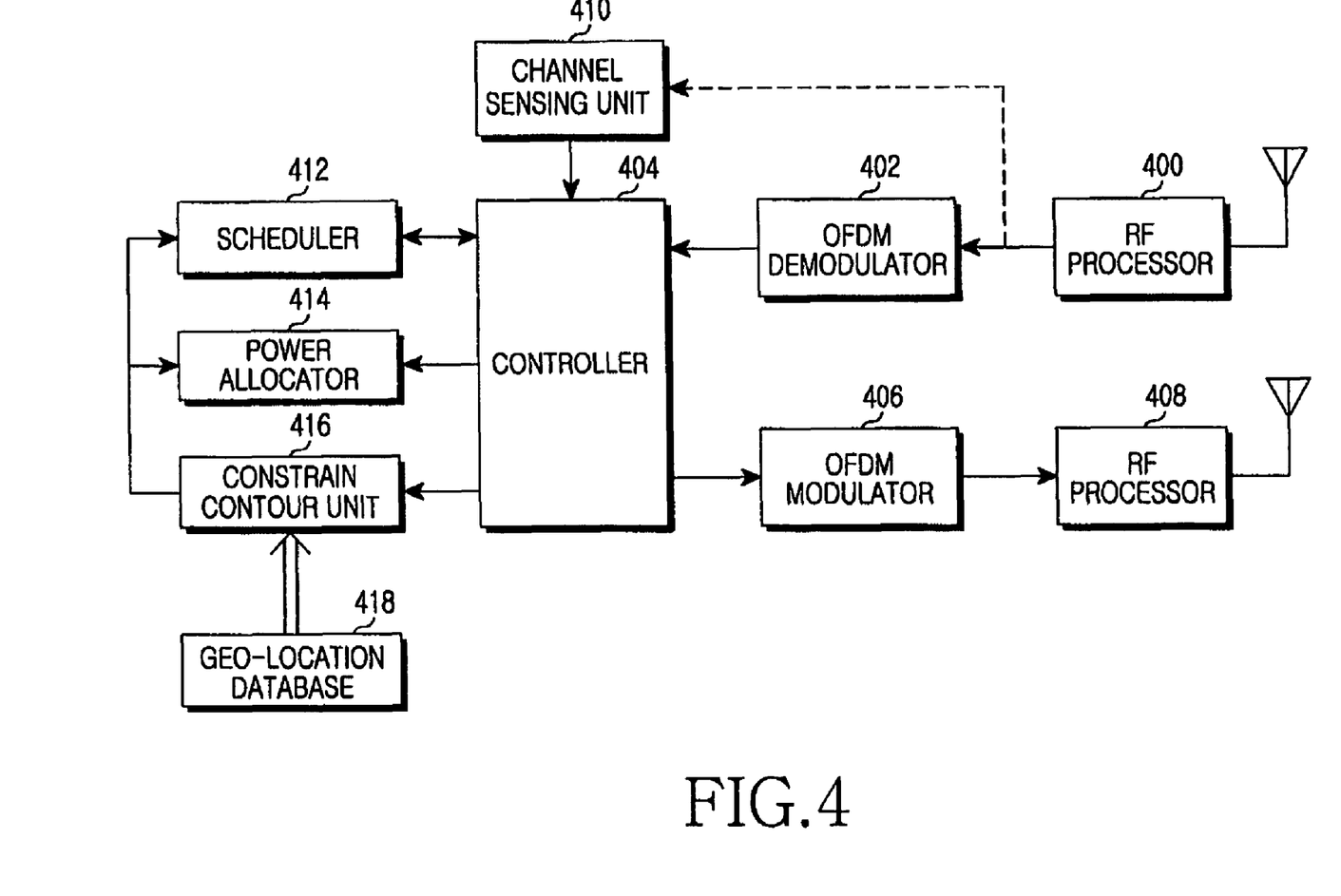
FIG. 4 is a block diagram for a joint power control apparatus of the BS in the CR wireless communication system according to an exemplary embodiment of the present invention.

FIG. 4 is a block diagram for a joint power control apparatus of the BS in the CR wireless communication system according to an exemplary embodiment of the present invention.

Referring to FIG. 4, the joint power control apparatus includes a Radio Frequency (RF) processor 400, an Orthogonal Frequency Division Multiplexing (OFDM) demodulator 402, a controller 404, an OFDM modulator 406, and an RF processor 408, a channel sensing unit 410, a scheduler 412, a power allocator 414, and a constrain contour setup unit 416.

The RF processor 400 downconverts an RF signal received through an antenna. The OFDM demodulator 402 converts the analog signal to sample data, and converts the sample data to frequency data by Fast Fourier Transform (FFT). Also the OFDM demodulator 402 selects data on desired subcarriers from the frequency data and demodulates and decodes the selected data at a predetermined Modulation and Coding Scheme (MCS) level.

The controller 404 analyzes a control message received from the OFDM demodulator 402, operates in accordance with the analysis and outputs the analysis result to OFDM modulator 406. Also, the controller 404 is provided the result of signal detection and decides frequency band available to use the data transmission.

The OFDM modulator 406 encodes and modulates the control message at a predetermined MCS level, converts the modulated data to sample data (i.e., an OFDM symbol) by Inverse Fast Fourier Transform (IFFT), and converts the same data to an analog signal. The RF processor 408 upconverts the analog signal to an RF signal and transmits the RF signal through an antenna.

Here, The controller 404 performs corresponding process for information outputted from the OFDM demodulator 402, and outputs the result the OFDM modulator 406.

The scheduler 412 selects service CPEs after considering channel state and geo-location of each CPE, and allocates subcarriers and transmits power. Namely, the scheduler 412 allocates carriers to one or multiple users for any time slot. Then the carrier allocation and scheduling is performed by the BS, and is known to the corresponding CPEs before duplex transmission on DL and DL, and is provided with the geo-location information from database 418.

The power allocator 414 checks whether there are CPEs needed JTPC within constraint area. And the power allocator 414 calculates maximum power ($P_{CPE,k,n}^{max}$) according to maximum tolerable inference level, reduces each level of CPE $P_{CPE,k,n}^{max}$ so that total sum of power may not exceed maximum tolerable inference level.

Below are a few examples for reducing each level of CPE $P_{CPE,k,n}^{max}$. There are how to reduce power from the maximum one by the same amount for each of CPE, how to reduce CPE maximum power according to their allocated sub-carriers, how to reduce CPE maximum power according to their allocated sub-carriers as well as the sub-carrier reuse situation by peer CPEs.

The constrain contour setup unit 416 calculates a constrain contour by reading information for a protected contour on channel n+m of incumbent system from the geo-location database 418. Here, JTPC is performed in the constraint area determined by a protected contour and a constrain contour. According to another embodiment, the geo-location database 418 is comprised of as partial device of the BS, or the geo-location database 418 exist with the BS independently.

The joint power control for CPEs described above with reference to FIGS. 3 and 4 is performs in the BS, similarity, the joint power control for BS is performs like the joint power control for CPEs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling power in a cognitive radio wireless communication system, the method comprising:
    performing channel scheduling and a first power control for a first plurality of service terminals;
    determining whether the first plurality of service terminals exists within a constraint area, and determining whether a second plurality of service terminals within the constraint area, among the first plurality of service terminals, causes interference to an incumbent system; and
    performing a second power control so that power to be allocated to each of the second plurality of service terminals within the constraint area is less than or equal to a maximum tolerable interference, wherein the second plurality of service terminals within the constraint area are included in the second power control, while an another service terminal, which is not present in the constraint area, among the first plurality of service terminals, is not included in the second power control.

2. The method of claim 1, wherein the constraint area is determined as an intersection area between a first boundary and a second boundary, and
    the first boundary is to protect the incumbent system and the second boundary is defined so that a signal strength of the incumbent system at the second boundary is Δ dB lower than the signal strength of the incumbent system at the first boundary.

3. The method of claim 1, wherein determining whether, the second plurality of service terminal within area causes interference to the incumbent system comprises:
    confirming that the second plurality of service terminal within the constraint area is scheduled to use a corresponding channel band, and confirming that the incumbent system uses the corresponding channel band and adjacent channel bands.

4. The method of claim 1 further comprising:
    obtaining information from a geo-location information database to determine the constraint area.

5. The method of claim 1, wherein performing the second power control comprises:
    calculating a maximum power ($P_{CPE,k,n}^{max}$) of each of the second plurality of service terminals within the constraint area, according to the maximum tolerable interference;
    reducing the maximum power ($P_{CPE,k,n}^{max}$) of each of the second plurality of service terminals within the constraint area so that a total sum of the maximum power ($P_{CPE,k,n}^{max}$) of each of the second plurality of service terminals within the constraint area is less than or equal to the maximum tolerable interference and calculating a power ($P_{CPE,k,n}^{temp}$) for each of the second plurality of service terminals; and
    comparing the power ($P_{CPE,k,n}^{temp}$) with a power ($P_{CPE,k,n}^{(0)}$) allocated by the first power control for each of the second plurality of service terminals, and selecting lower one of two powers.

6. The method of claim 5, wherein reducing the maximum power comprises:
    reducing the maximum power ($P_{CPE,k,n}^{max}$) for each of the second plurality of service terminals, by a same amount, according to one of a number of allocated sub-carriers and reuse condition of the allocated sub-carriers.

7. The method of claim 1, wherein the cognitive radio wireless communication system does not intersect with the incumbent system and is far enough away from the incumbent system independently.

8. The method of claim 1, wherein performing the second power control comprises:
    selecting a lower power, of a first power allocated by the first power control and a calculated power such that a sum of the calculated power for each of the each of the plurality of service terminals is less than or equal to the maximum tolerable interference, as the power to be allocated.

9. The method of claim 1, wherein the method is performed using at least a controller in a base station in the cognitive radio wireless communication system.

10. An apparatus configured to control power in a cognitive radio wireless communication system, the apparatus comprising:
    a scheduler configured to perform channel scheduling and a first power control for a first plurality of service terminals;

a controller configured to check whether the first plurality of service terminals exists within a constraint area, and determine whether a second plurality of service terminals within the constraint area, among the first plurality of service terminals, causes interference to an incumbent system; and a power allocator configured to perform a second power control so that power to be allocated to each of the second plurality of service terminals within the constraint area is less than or equal to a maximum tolerable interference, wherein the second plurality of service terminals within the constraint area are included in the second power control, while an another service terminal, which is not present in the constraint area, is not included in the second power control.

11. The apparatus of claim 10, wherein the constraint area is determined as an intersection area between a first boundary and a second boundary, and the first boundary is to protect the incumbent system, and the second boundary is defined so that a signal strength of the incumbent system at the second boundary is Δ dB lower than the signal strength of the incumbent system at the first boundary.

12. The apparatus of claim 10, wherein the controller is further configured to confirm that the second plurality of service terminals within the constraint area is scheduled to use a corresponding channel band, and confirm that the incumbent system uses the corresponding channel band and adjacent channel bands.

13. The apparatus of claim 10 further comprising:

a constrain contour setup unit configured to obtain information from a geo-location information database to determine the constrain area.

14. The apparatus of claim 10, wherein the power allocator is further configured to calculate a maximum power ($P_{CPE,k,n}^{max}$) of the second plurality of service terminals within the constraint area according to the maximum tolerable interference, reduce the maximum power ($P_{CPE,k,n}^{max}$) of each of the second plurality of service terminals so that a total sum of the maximum power ($P_{CPE,k,n}^{max}$) of each of the second plurality of service terminals is less than or equal to the maximum tolerable interference and calculate power ($P_{CPE,k,n}^{temp}$) for each of the second plurality of service terminals, and compare the power ($P_{CPE,k,n}^{temp}$) with a power ($P_{CPE,k,n}^{(0)}$) allocated by the first power control for each of the second plurality of service terminals, and select lower one of two powers.

15. The apparatus of claim 14, wherein the power allocator is further configured to reduce the maximum power ($P_{CPE,k,n}^{max}$) for each of the second plurality of service terminals, by a same amount, according to one of a number of the allocated sub-carriers and reuse condition of the allocated sub-carriers.

16. The apparatus of claim 10, wherein the cognitive radio wireless communication system does not intersect with the incumbent system and is far enough away from the incumbent system independently.

17. The apparatus of claim 10, wherein in performing the second power control, the controller is further configured to select a lower power, of a first power allocated by the first power control and a calculated power such that a sum of the calculated power for each of the each of the plurality of service terminals is less than or equal to the maximum tolerable interference, as the power to be allocated.

18. The apparatus of claim 9, wherein the scheduler, the controller, and the power allocator are located in a base station in the cognitive radio wireless communication system.

* * * * *